United States Patent Office 3,331,775
Patented July 18, 1967

3,331,775
LUBRICATING COMPOSITIONS
Anthony Joseph Saraceno, Devon, Pa., assignor to Pennsalt Chemicals Corporation, Philadelphia, Pa., a corporation of Pennsylvania
No Drawing. Filed Oct. 4, 1966, Ser. No. 584,115
9 Claims. (Cl. 252—32.5)

This application is a continuation-in-part of my application Ser. No. 479,647, filed Aug. 13, 1965, and now abandoned.

This invention deals with improved silicone compositions and is particularly concerned with improved fluid lubricants and greases made from silicone fluids.

Silicone fluids and silicone greases are well known in the art. Silicone greases are conventionally prepared by adding a thickening agent such as a lithium soap to a silicone liquid. In preparing such greases, the amount of additive used has been rather high, being on the order of about 30% by weight of the total grease composition. The use of such a high amount of additive is undesirable from an economic standpoint where the additive is expensive, and also in that large amounts of the additive frequently adversely affect the lubricant and grease properties desired.

It has now been found that improved silicone fluids and improved silicone greases can be prepared by incorporating in a silicone fluid a relatively low molecular weight chromium phosphinate copolymer. More specifically, the invention comprises a silicone fluid containing an improving amount of a copolymer having an intrinsic viscosity below about 0.5 in $CHCl_3$ consisting of a doubly bridged chromium atom coordinated with a hydroxyl group and a water molecule, characterized by having at least two different bridging groups wherein each bridging group is the anion of an acid $R_2P(O)OH$, where R is alkyl or aryl containing from 1 to 18 carbon atoms and with the proviso that at least one bridging group contain at least one alkyl group, said copolymer being terminated at its ends by the anion of an aliphatic carboxylic acid containing from one to four carbon atoms. Thus the copolymers defined above may be represented by the following formula:

$R_3(H_2O)[Cr(OH)(H_2O)(OPR_1R_1O)_n$
$(OPR_2R_2O)_m]_xCr(OH)(H_2O)_2R_3$ where $R_1$ and $R_2$ are alkyl or aryl groups, at least one of said R groups being alkyl, $R_3$ is the anion of a carboxylic acid containing from one to four carbon atoms (e.g., formate, acetate, propionate and butyrate), and where it is understood that the repeating units are random in nature. The above terms alkyl and aryl describing the R groups is intended to include substituted alkyl and aryl such as haloalkyl and haloaryl, including perhalo such as perchloro and perfluoro substituents. It will also be understood that the ratio of n to m, which are not necessarily integers, may vary, although the sum of n and m will be two in order to satisfy the valence requirements of the chromium atom. The symbol x merely indicates the polymeric nature of the formula shown.

The copolymers as defined thus contain at least one alkyl group in a repeating unit of the polymer, and this is a requirement for making the improved fluids and greases of the invention. If the $R_1$ and $R_2$ groups are all aryl groups, a suitable product cannot be prepared because the copolymer is incompatible with the silicone fluid causing separation of the components. The presence of at least one alkyl group in a repeating unit of the polymer contributes properties to the copolymer which do enable it to be useful for making the greases of the invention. The intrinsic viscosity limitation of below about 0.5 in chloroform is significant in that if the copolymer has an intrinsic viscosity much above this value, the copolymers are incompatible with silicone fluid.

The inorganic polymers as described above are disclosed and claimed in U.S. 3,275,574, filed in the name of Anthony J. Saraceno on July 15, 1964, and issued Sept. 27, 1966. Such polymers are particularly described in Example 9 of that application. In accord with the procedure described there, chromous acetate monohydrate, or other chromous aliphatic acid salt hydrate, is reacted by refluxing it in water with the appropriate phosphinic acids, and the intermediate product is then oxidized with air. In carrying out this procedure, the amount of phosphinic acid used will be slightly less stoichiometrically than the amount of chromous salt, and in this way the polymer that is obtained will be terminated (i.e., end-capped) by the anion of the aliphatic acid as discussed above. In a preferred procedure, the reaction product between the phosphinic acid mixture and the chromous salt is oxidized in a mixed solvent system consisting of tetrahydrofuran and water such as described in the copending application of J. P. King, Ser. No. 479,631, filed Aug. 13, 1965. Examples of the copolymers which may be used to form improved liquids and greases in accordance with this invention are as follows:

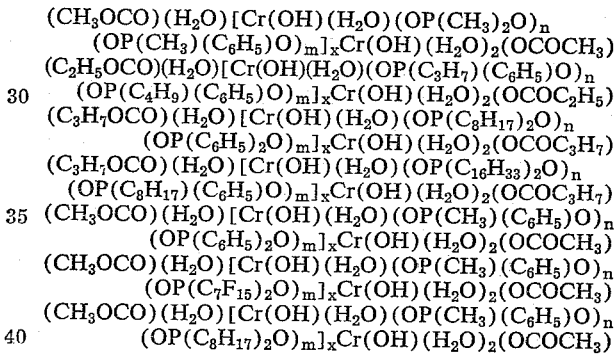

and the like. It will be understood also that the two bridging groups in each repeating unit need not be the same and such an arrangement in the repeating units making up the polymer will result because of the random nature of the repeating units in the polymer obtained.

The silicone fluid which will be used for the preparation of the improved fluids and greases of the invention will be any of the well-known silicone polymer fluids which heretofore have been used for grease preparation by the addition of thickeners. Thus, any grease-forming silicone liquid may be used, but preferably for the purposes of this invention there will be employed the well-known alkyl-aryl-substituted silicone fluids. Specific examples of useful fluids will include methylphenyl silicones, chlorophenylmethyl silicones, and the like. Such silicone fluids are described in detail in the text, "Synthetic Lubricants," by Gunderson and Hart, Reinhold Publishing Company, 1962.

The preparation of the fluids and greases in accord with the invention is straightforward and requires only that the copolymer be added to the silicone fluid and, preferably, the mixture heated with stirring at temperatures up to 600° F., usually under an inert atmosphere such as nitrogen. In general, the amount of copolymer added will determine whether a fluid or a grease is obtained as product. To form a fluid, the amount of copolymer added will be on the order of from about 0.1% to about 5% by weight of the composition. To form a grease composition, from about 3% to about 15% by weight of the composition will be used. Some overlap is evident due to the differences between copolymers and silicone fluids which may be used in any specific preparation. In making greases, the above procedure will also be used, except that stirring will be continued until the mixture sets to the consistency of the desired grease. The usual milling procedures used for grease formation may be employed. In an alternate procedure, the silicone fluid may be used as a solvent for preparation of the chromium phosphinate copolymer, in which procedure the polymerization of the chromium phosphinate intermediate is carried out by dispersing it in the fluid and permitting oxidation to occur.

The amount of copolymer additive used to form a grease from the silicone fluid is relatively small in comparison with the amounts of additives generally employed heretofore. In prior art techniques an amount of additive on the order of about 30% is generally required to give a suitable grease. On the other hand, in accord with this invention, smaller amounts of the copolymer additive are used and grease formation has been achieved successfully with from about 3% to about 15% by weight. Generally, the higher the amount of additive used, the higher the dropping point of the grease. For soft greases, the lower amounts of copolymer will be used. The greases made in accordance with the invention have excellent properties and can withstand long term exposure at elevated temperatures without degradation. The greases have little tendency to bleed, are workable at room temperature, and show no effects of catalytic degradation due to interaction between the lubricant and additive.

The improved silicone fluids of the invention also have excellent high temperature properties and also have good lubricity. They have higher viscosity and antiwear properties than conventional silicone fluids. They are particularly valuable as lubricating oils in systems subject to high temperature.

In order to further illustrate the invention, the following examples are given:

Example 1

5.0 parts by weight of $$CH_3OCO\diagdown$$
$$[Cr(H_2O)(OH)(OP(C_6H_5)(CH_3)O)_{1.1}$$
$$H_2O\diagup$$

$$(OP(C_8H_17)_2O)_{0.9}]_{11}\underset{\underset{H_2O\diagup\ \diagdown H_2O}{|}}{\overset{OH\diagdown\ \diagup OCOCH_3}{Cr}}$$

is added to 45 parts by weight of methylphenyl silicone (DC 550 silicone fluid) under $N_2$ with magnetic stirring. The suspension is heated to 240–300° F. for 7½ hours to yield a grease. The grease is cooled under $N_2$ to room temperature and is then ready for use.

Example 2

Following the procedure in Example 1, the following silicone greases are prepared and their properties are shown in Table I.

TABLE I

[Greases prepared with methylphenyl silicone (DC 550 silicone fluid) by incorporation of copolymer of formula $(CH_3OCO)(H_2O)[Cr(OH)(H_2O)$ $(OP(CH_3)(C_6H_5)O)_m(OP(C_8H_{17})_2O)_m]_xCr(OH)(H_2O)_2(OCOCH_3)]$

| Copolymer Composition | | | | Wt. percent Concentration of copolymer | Dropping point, ° F. (ASTM) |
|---|---|---|---|---|---|
| n | m | x | Intrinsic Viscosity | | |
| 1.1 | 0.9 | 11 | 0.18 | 10 | 436 |
| 1.33 | 0.67 | 38 | 0.32 | 10 | 450 |
| 1.2 | 0.8 | 10 | 0.14 | 10 | 350 |

Example 3

Following the procedure of Example 1, a grease is prepared from 97 parts by weight of methylphenyl silicone (DC 710 silicone fluid) by adding 3 parts by weight of a copolymer having an intrinsic viscosity in chloroform of 0.25 and of the formula $$(CH_3OCO)(H_2O)[Cr(OH)(H_2O)(OP(C_4H_9)_2O)$$
$$(OP)(C_8H_{17})_2O)]_{30}Cr(OH)(H_2O)_2(OCOCH_3)$$

Example 4

Following the procedure of Example 1, a grease is prepared from 92 parts by weight of chlorophenylmethyl silicone by adding 8 parts by weight of a copolymer having an intrinsic viscosity in chloroform of 0.3 and of the formula $$(HCOO)(H_2O)[Cr(OH)(H_2O)(OP(C_8H_{17})_2O)_{1.2}$$
$$(OP)(C_6H_5)_2O)_{0.8}]_{40}Cr(OH)(H_2O)_2(HCOO)$$

Example 5

An improved silicone oil is prepared by adding 0.6 part by weight of a copolymer having an intrinsic viscosity in chloroform of 0.14 and of the formula $$(CH_3OCO)(H_2O)[Cr(H_2O)(OH)$$
$$(OP(C_6H_5)(CH_3)O)_{1.1}(OP(C_8H_{17})_2O)_{0.9}]_{15}$$
$$Cr(OH)(H_2O)_2(OCOCH_3)$$

to 29.4 parts by weight of methylphenyl silicone (DC 550 silicone fluid) under nitrogen atmosphere and with stirring at 150° C. for 24 hours, after which time the copolymer is completely in solution. This 2% by weight solution has a viscosity of 159 cs. at 100° F.

The viscosity of the fluids as prepared above will vary with the concentration of inorganic polymer in the liquid silicone, and the following Table II illustrates this effect:

TABLE II

[Viscosity of silicone liquid (DC 550) containing various amounts of the copolymer of Example 5]

| Copolymer Concentration (Percent by Weight) | Viscosity (Cs. @ 100 F.) |
|---|---|
| 0 | 72.4 |
| 0.33 | 86.1 |
| 0.50 | 92.5 |
| 1.0 | 115.1 |
| 2.0 | 159.0 |

When the above liquids which contain the copolymer are heated at 250° F. for over four hundred hours, no viscosity change is observed.

In addition to the viscosity increase imparted to the silicone oil by the copolymer, the oils and greases of the invention have improved antiwear characteristics; i.e., they possess extreme pressure characteristics associated with improved lubricity. For example, in Shell 4-ball wear tests conducted at 1800 r.p.m. and 77° F., a non-soap silicone grease from DC 550 shows seizure at 120 kg. load. However, with a grease of this invention such as that of Example 1 made from DC 550 with a copolymer, but where $X=30$, seizure does not occur until a load of 160 kg. is reached.

Example 6

Following the procedure of Example 1, a grease is prepared from 45 parts by weight of methylphenyl silicone (DC 550 silicone fluid) by adding 5 parts by weight of a copolymer having an intrinsic viscosity in chloroform of 0.20 and of the formula $$(CH_3OCO)(H_2O)[Cr(OH)(H_2O)(OP(CH_3)(C_6H_5)O)$$
$$(OP(C_7F_{15})_2O)]_{15}Cr(OH)(H_2O)_2(OCOCH_3)$$

Example 7

Following the procedure of Example 1, a grease is prepared from 45 parts by weight of methylphenyl silicone (DC 550 silicone fluid) by adding 5 parts by weight of a copolymer having an intrinsic viscosity in chloroform of 0.25 and of the formula $$(CH_3OCO)(H_2O)[Cr(OH)(H_2O)(OP(C_{14}H_{29})_2O).$$
$$_8(OP(C_6H_5)_2O)_{1.2}]_{20}Cr(OH)(H_2O)_2(OCOCH_3)$$

I claim:

1. A lubricating composition comprising a silicone and a thickening amount of a copolymer having an intrinsic viscosity in chloroform below about 0.5 and consisting of a doubly bridged chromium atom coordinated with a hydroxyl group and a water molecule, characterized by having at least two different bridging groups wherein each bridging group is the anion of an acid $R_1R_2P(O)OH$, where $R_1$ and $R_2$ are selected from the group consisting of alkyl and aryl containing from 1 to 18 carbon atoms and with the proviso that at least one bridging group contain at least one alkyl group, and said copolymer being terminated at its ends by the anion of an aliphatic carboxylic acid containing from one to four carbon atoms.

2. A lubricating composition comprising an alkyl-aryl silicone and from about 0.1% to about 15% by weight of the composition of a copolymer having an intrinsic viscosity in chloroform below about 0.5 and consisting of a doubly bridged chromium atom coordinated with a hydroxyl group and a water molecule, characterized by having at least two different bridging groups wherein each bridging group is the anion of an acid $R_1R_2P(O)OH$ where $R_1$ and $R_2$ are selected from the group consisting of alkyl and aryl containing from 1 to 18 carbon atoms and with the proviso that at least one bridging group contains at least one alkyl group, and said copolymer being terminated at its ends by the acetate anion.

3. A grease composition as in claim 2 wherein the silicone is methylphenyl silicone and the bridging groups are derived from methylphenylphosphinic acid and dioctylphosphinic acid.

4. A grease composition as in claim 2 wherein the silicone is methylphenyl silicone and the bridging groups are derived from dibutylphosphinic acid and dioctylphosphinic acid.

5. A grease composition as in claim 2 wherein the silicone is chlorophenylmethyl silicone and the bridging groups are derived from dioctylphosphinic acid and diphenylphosphinic acid.

6. A fluid composition as in claim 2 wherein the silicone is methylphenylsilicone.

7. A fluid composition as in claim 2 wherein the silicone is methylphenylsilicone and the bridging groups are derived from methylphenylphosphinic acid and dioctylphosphinic acid.

8. A fluid composition as in claim 2 wherein the silicone is chlorophenylmethyl silicone.

9. A fluid composition as in claim 2 wherein the silicone is methylphenylsilicone and the bridging groups are derived from methylphenylphosphinic acid and di-perfluoroheptyl phosphinic acid.

References Cited

UNITED STATES PATENTS

| | | | |
|---|---|---|---|
| 2,976,238 | 3/1961 | Elliott et al. | 260—32.5 |
| 3,197,436 | 7/1965 | Block et al. | 260—2 |

DANIEL E. WYMAN, *Primary Examiner.*

I. VAUGHN, *Assistant Examiner.*